United States Patent [19]

Rice

[11] Patent Number: 4,748,715
[45] Date of Patent: Jun. 7, 1988

[54] ADJUSTABLE ROLLER ASSEMBLY

[75] Inventor: Frank L. Rice, Louisville, Ky.

[73] Assignee: General Electric Company, Louisville, Ky.

[21] Appl. No.: 75,435

[22] Filed: Jul. 20, 1987

[51] Int. Cl.⁴ .............................................. B60B 33/06
[52] U.S. Cl. ........................................ 16/19; 16/29; 16/34; 16/31 A; 16/40
[58] Field of Search .............. 16/19, 34, 32, 29, 31 A, 16/31 R, 40, 45, 105; 312/236; 411/423, 424

[56] References Cited

U.S. PATENT DOCUMENTS

| | | | |
|---|---|---|---|
| 1,693,920 | 12/1928 | Hartmann. | |
| 2,853,732 | 9/1958 | Matter | 16/32 |
| 3,040,391 | 6/1962 | Saunders | 16/105 |
| 3,386,208 | 6/1968 | Banner | 16/105 |
| 3,534,430 | 10/1970 | Kesling et al. | 16/34 |
| 3,670,357 | 6/1972 | Steigerwald | 16/105 |
| 3,844,578 | 10/1974 | Matyskella et al. | 280/43.22 |
| 4,386,447 | 6/1983 | Baus | 16/105 |

Primary Examiner—Nicholas P. Godici
Assistant Examiner—Gerard M. Reid
Attorney, Agent, or Firm—Radford M. Reams; Frederick P. Weidner

[57] ABSTRACT

An adjustable roller assembly for supporting and leveling an appliance including a rail secured to the appliance and having a keyhole opening with a horizontal stationary base frame secured to the rail. A bracket having a bottom end is pivotally secured to the base frame and the top end of the bracket has a threaded nut spaced from the keyhole opening in the rail. A roller is rotatably secured to the bottom end of the bracket and is movable up and down relative to the stationary base frame in response to pivotal movement of the bracket. A horizontally disposed bolt having a head portion, a shank portion, a threaded portion, and an unthreaded terminal end portion is provided with the shank portion passing through the keyhole opening in the rail. The head portion is located on one side of the rail, and the threaded portion on the opposite side of the rail and threadingly engages the nut. The shank portion has a stop projecting to prevent withdrawal of the shank portion through the keyhole opening in the rail and the stop projection and unthreaded terminal end portion are spaced from each other a distance greater than the distance of the nut from the keyhole opening in the rail to prevent withdrawal of the bolt from the threaded nut.

5 Claims, 4 Drawing Sheets

ADJUSTABLE ROLLER ASSEMBLY

BACKGROUND OF THE INVENTION

This invention relates to a height adjustable retracting caster or roller assembly, and more particularly to a roller assembly for a heavy domestic appliance such as a refrigerator or the like. Equipping heavy domestic appliances with roller assemblies for mobility has been a customary practice. This enables the appliance supported by the roller assemblies to be easily moved.

Roller assemblies that may be moved up or down relative to the appliance are desirable so that the appliance may be leveled and it is desirable that the roller assemblies be easily adjustable up and down by the use of simple tools. Therefore, a good roller assembly design should be constructed to require only a minimum effort to perform the height adjustment.

By this invention there is provided a novel arrangement of simple parts which function to produce the aforesaid desirable attributes in a readily installed, easily adjustable roller assembly.

SUMMARY OF THE INVENTION

An adjustable roller assembly for supporting and leveling an appliance including a rail secured to the appliance and having a keyhole opening with a horizontal stationary base frame secured to the rail. A bracket having a bottom end is pivotally secured to the base frame and the top end of the bracket has a threaded nut spaced from the keyhole opening in the rail. A roller is rotatably secured to the bottom end of the bracket and is movable up and down relative to the stationary base frame in response to pivotal movement of the bracket. A horizontally disposed bolt having a head portion, a shank portion, a threaded portion, and an unthreaded terminal end portion is provided with the shank portion passing through the keyhole opening in the rail. The head portion is located on one side of the rail, and the threaded portion on the opposite side of the rail and threadingly engages the nut. The shank portion has a stop projection to prevent withdrawal of the shank portion through the keyhole opening in the rail and the stop projection and unthreaded terminal end portion are spaced from each other a distance greater than the distance of the nut from the keyhole opening in the rail to prevent withdrawal of the bolt from the threaded nut.

DESCRIPTION OF THE PREFERRED EMBODIMENT

Figure 1:
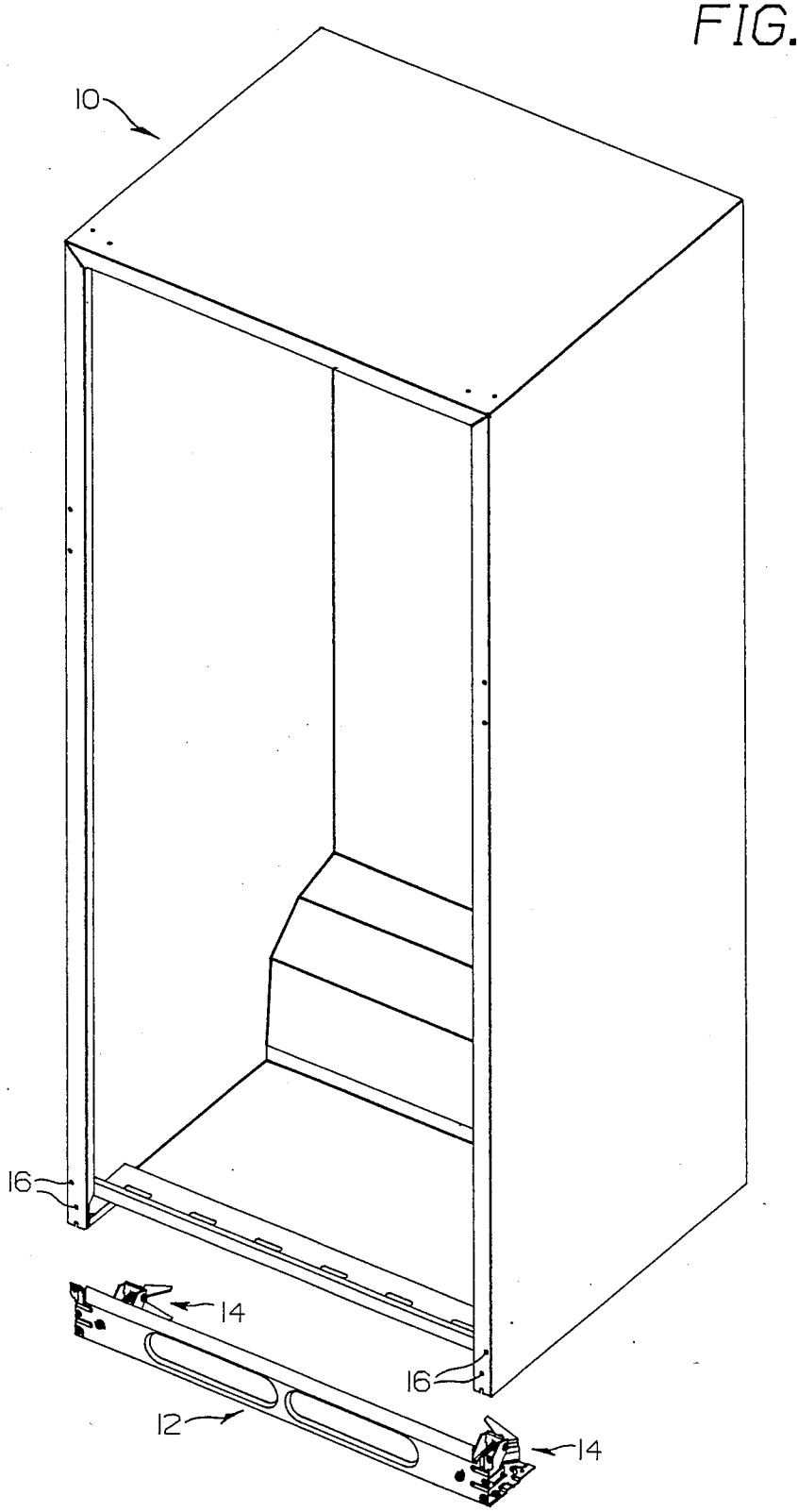
FIG. 1 is a perspective view of a household refrigerator outer metal shell and including the present invention.

With reference to FIG. 1, a refrigerator outer metal shell 10 is shown. Secured to the bottom front of the outer metal shell is a rail 12 which is utilized to structurally support the refrigerator at the bottom front thereof and this rail carries a roller assembly 14 at each corner, which roller assemblies are utilized to adjust the height of each corner and thereby level the refrigerator at the front. The roller assemblies are also used for mobility of the refrigerator. The rail 12 in the preferred embodiment is made of relatively heavy gage sheet metal and is prepainted. The rail 12 is secured by suitable means, such as screws (not shown), through predrilled holes 16 located at the bottom of the outer metal shell 10. It will be understood that while two roller assemblies 14 are located at each of the front corners of the outer metal shell 10, only one roller assembly will be described since they are both identical.

Figure 2:
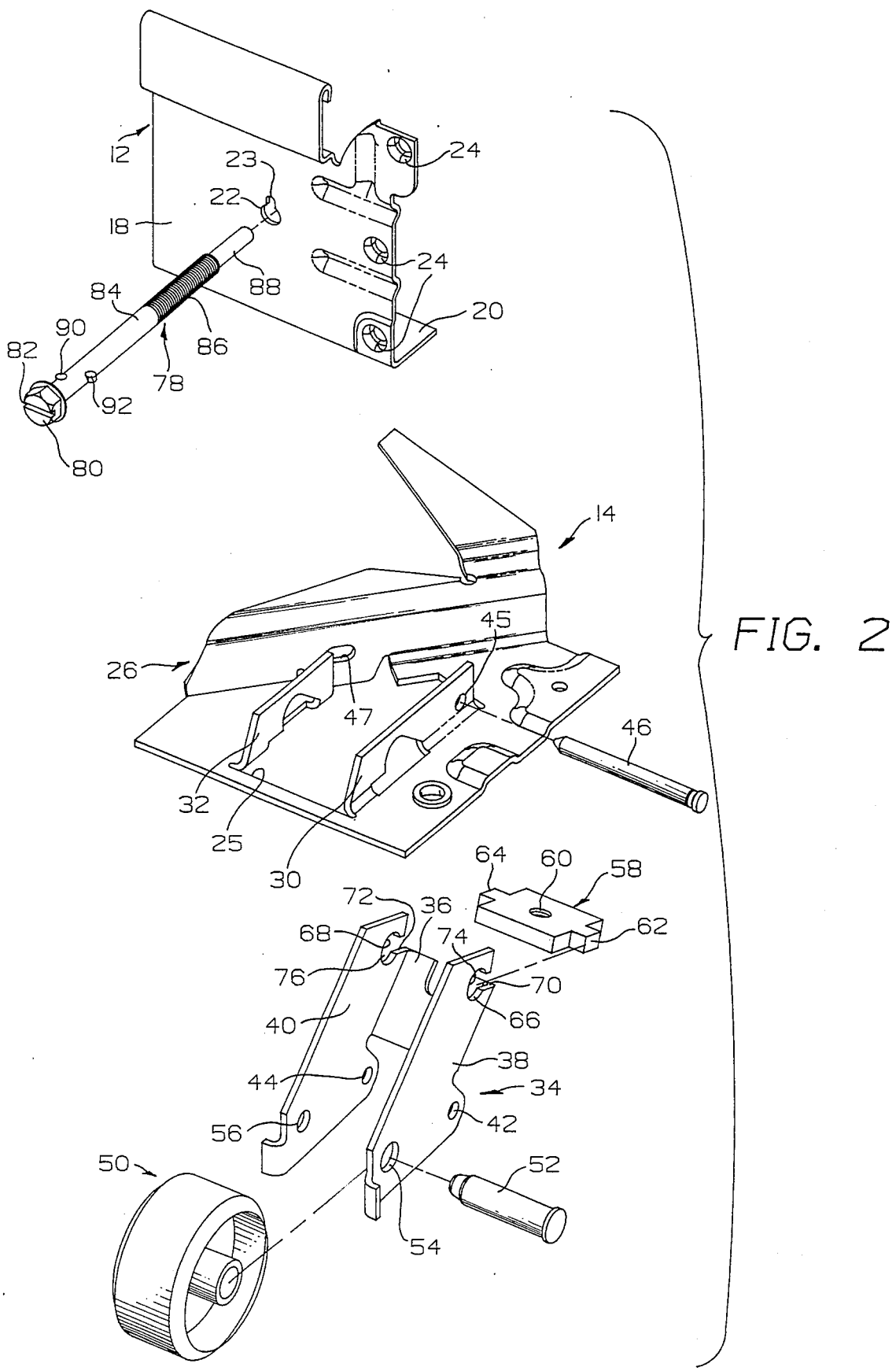
FIG. 2 is an exploded perspective view of the roller assembly of the present invention.

With reference to FIG. 2, the roller assembly of the present invention includes the rail 12 which is made from sheet metal and has a front face 18 and a rearwardly directed bottom flange 20. The front face 18 has a keyhole opening 22 with a portion thereof formed as a slot 23 and screw openings 24 for securing the rail 12 to the outer metal shell 10. Secured to the rail 12 is a horizontal stationary base frame 26 which is rigidly secured to the bottom flange 20 of the rail 12 as by some form of metal stitching. The preferred embodiment of this invention uses a TOG-L-LOC fastener 28 (FIGS. 4-6), which is well known in the art. One suitable apparatus to form metal stitching such as a TOG-L-LOC fastener is sold by BTM Corporation, Marysville, Mich. Metal stitching such as a TOG-L-LOC fastener is made from two metal members having a section of each offset one within the other to provide an integral rivet or fastener formation. The base frame 26 has two spaced apart vertical flanges 30 and 32 with an opening 25 between the flanges. A bracket 34 which is in the form of a U-shaped channel has a base wall 36 and spaced apart legs 38 and 40, with the legs having apertures 42 and 44 respectively at the bottom end thereof. A pivot pin 46 passes through apertures 42 and 44 in bracket 34 and through aperture 45 in vertical flange 30 and aperture 47 in the base frame 26 to pivotally secure the bracket 34 to the base frame 26 to allow the bracket to pivot up and down within the opening 25 in the base frame.

A roller 50 is rotatably secured to the bottom end of the bracket 34 by means of an axle 52 passing through an aperture 54 in leg 38 and rotatably secured in an aperture 56 located at the bottom end of leg 40 of the bracket 34.

Figure 5:
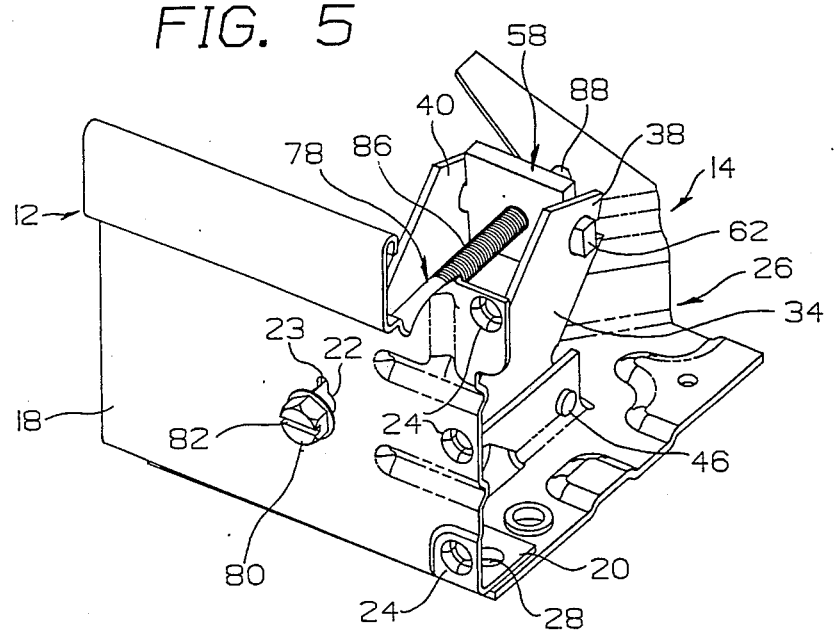
FIG. 5 is a perspective view of the roller assembly of the present invention as shown in FIG. 4.
Figure 4:
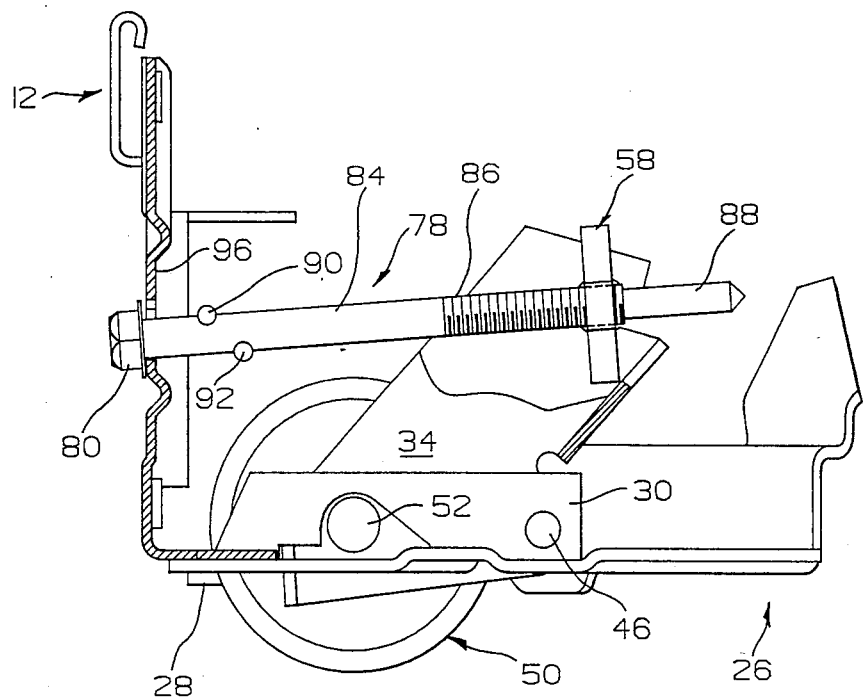
FIG. 4 is a side elevational view partially in section showing the roller assembly of the present invention.
Figure 6:
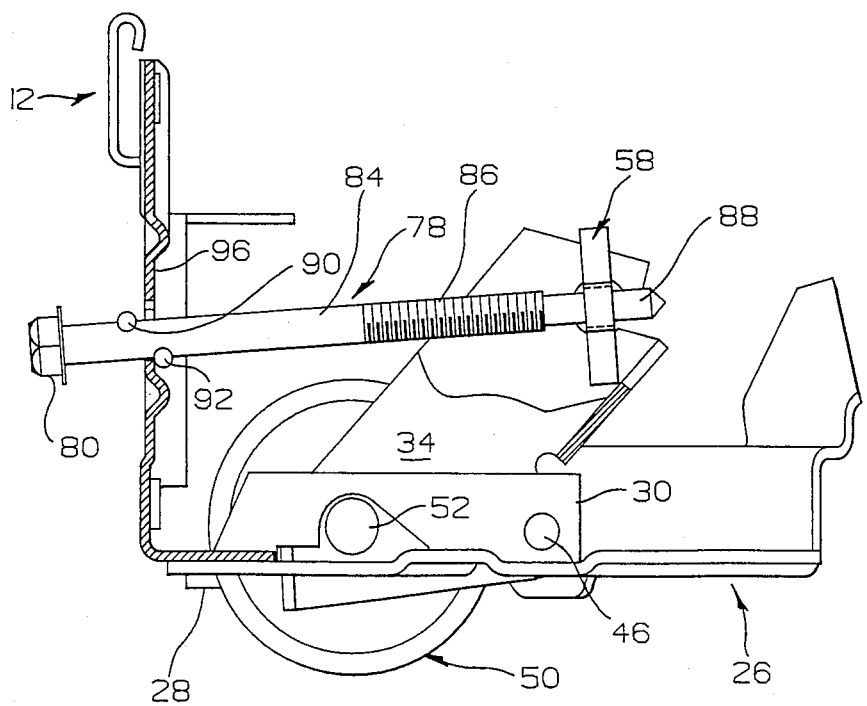
FIG. 6 is a side elevational view in partial section showing the roller assembly of the present invention.

Located at the top of the bracket 34 is a nut 58 having a threaded aperture 60 and the nut has at each side thereof projections or tangs 62 and 64. The top end of the bracket 34 has a keyhole opening 66 in leg 38 and a keyhole opening 68 in leg 40. The tangs 62 and 64 are slightly smaller than the slots 70 and 72 of the keyhole openings 66 and 68 respectively. The nut 58 is inserted through the slots 70 and 72 as shown in FIG. 2 and then rotated 90° so that the nut will be in a vertical oriented position as shown in FIGS. 4-6. The circular portions 74 and 76 of keyholes 66 and 68 respectively are large enough to allow the nut 58 to pivot relative to the bracket 34 so that the nut will always be in a vertical oriented position regardless of the pivotal movement of the bracket 34 during height adjustment of the roller 50.

There is a bolt 78 having a hex head portion 80 with a slot 82, a shank portion 84, a threaded portion 86, and an unthreaded terminal end portion 88. The shank portion 78 passes through the keyhole opening 22 in the rail 12 with the head portion 80 located on one side of the rail 12 and the threaded portion 86 on the opposite side of the rail, which threaded portion 86 threadingly engages the nut 58 through the threaded aperture 60. The shank portion 84 has a first stop projection 90 to prevent withdrawal of the shank portion 84 back through the keyhole opening 22 in the rail 12. In the preferred embodiment there is a second stop projection 92 with one stop projection offset from the other around the shank portion 84. In the preferred embodiment the stop projections 90 and 92 are swaged into the shank portion 84, thus eliminating the need for a separate stop element. The bolt 78 is positioned by passing the unthreaded terminal end portion 88 through keyhole opening 22 and the threaded portion 86 is passed through the keyhole opening. The shank portion 84 is then passed through the keyhole opening 22 by turning the bolt so that the second stop projection 92 will mate with the slot portion 23 of the keyhole 22 and passes therethrough and then by rotating the bolt the first stop projection 90 may also pass through the keyhole opening in like manner. The position of the bolt 78 as shown in FIG. 4 has the stop projections 90 and 92 on the side of the rail 12 opposite from the head portion 80. As shown in FIGS. 4, 5 and 6, the unthreaded terminal end portion 88 of the bolt is spaced from the keyhole opening 22 in the rail 12 a distance greater than the distance of the nut 58 from the keyhole opening 22 in the rail 12.

Figure 3:
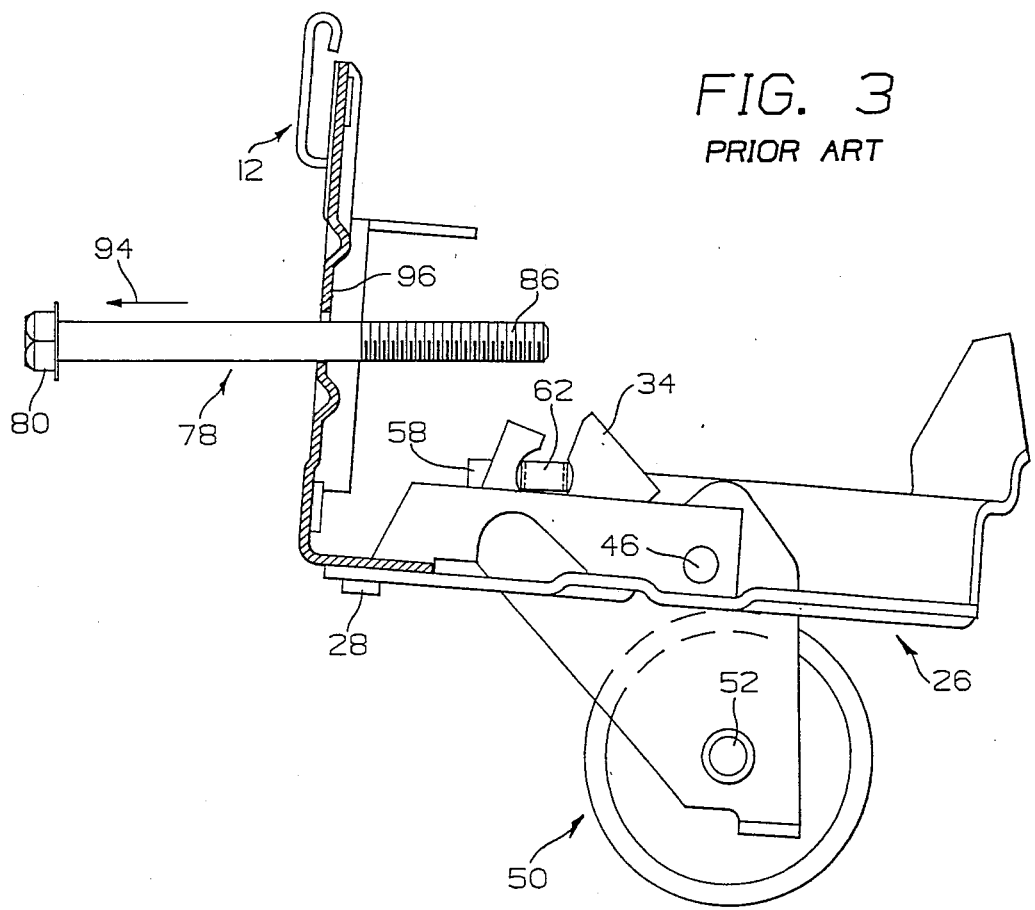
FIG. 3 is a side elevational view partially in section showing a prior art roller assembly.

With reference to FIG. 3, a prior art roller assembly is shown and illustrates the need to improve the roller assembly by means of the present invention. In the case of the roller assembly of FIG. 3, it will be particularly noted that the bolt 78 has a head portion 80 at one end and a threaded portion 86 at the other end, but there are no stop projections and no unthreaded terminal end portion 88 as in the case of the bolt of the present invention shown in FIGS. 2, 4-6. With this prior art roller assembly, when the bolt is turned clockwise the roller 50 is raised and when turned counterclockwise the roller 50 is lowered. If the weight of the appliance to which the roller assembly is secured is removed from the roller 50 as by lifting the front of the appliance, gravity allows the wheel to pivot about pivot pin 46 resulting in the bolt moving outwardly away from the rail 12 as shown by the arrow 94. If the threaded portion 86 is not completely removed from the threaded aperture 60 of the nut 58, then when the weight of the appliance is suddenly reapplied to the roller assembly, such as by dropping one or both corners of the appliance, damage can occur to the roller assembly. Moreover, if the bolt is rotated counterclockwise to lower the roller assembly, the threaded portion 86 can become disengaged from the nut 58 as shown in FIG. 3. The result is that the roller assembly assumes the position shown in FIG. 3 and the bolt cannot be threaded back through the nut without manually raising the front of the appliance and orienting the bolt and nut to make threaded engagement. This is a very cumbersome and undesirable procedure.

With reference to FIGS. 4 and 5, the roller assembly described in connection with FIG. 2 is shown in its assembled arrangement wherein the head portion 80 is located on one side of the rail 12, the shank portion 84 is on the opposite side of the rail 12, the threaded portion 86 threadedly engages the threaded aperture 60 of nut 58 and the unthreaded terminal end portion 88 projects rearwardly from the nut 58. By turning the bolt 78 in one direction or the other with a screwdriver or wrench, the bracket 34 is pivotally moved about pivot pin 46 to raise and lower the roller 50 to thereby balance the appliance to which the roller assembly is attached. In the event the bolt 78 is rotated to the point that the threaded portion 86 is disengaged from the nut 58 as shown in FIG. 6, the stop projection or projections 90 or 92 will abut against the back surface 96 of the rail 12 and prevent withdrawal of the shank portion 84 from the keyhole opening 22. In the preferred embodiment two stop projections 90 and 92 are provided and they are offset from each other around the shank portion 84 so that withdrawal of the shank portion through the keyhole 22 will be positively prevented even if there is the possibility that the stop projection 90 closest to the head portion 80 happens to be in alignment with the keyhole slot 23 and passes through it as shown in FIG. 6. As can be seen in FIG. 6, since the second projection 92 is offset from the first projection 90, the stop projection abuts the rear surface 96 of the rail 12. As can be seen also in FIGS. 4 and 5, the bolt 78 is arranged so that the stop projection 90 or stop projection 92 in the case of the preferred embodiment where two offset stop projections are used and the unthreaded terminal end portion 88 are spaced from each other a distance greater than the distance of the nut 58 from the keyhole opening 22 in the rail 12. With this arrangement then, the bolt 78 cannot be withdrawn from the nut 58 and by rotating the bolt in the opposite direction it may again be threaded back through the threaded opening 60 in the nut 58.

The foregoing is a description of the preferred embodiment of the invention and it should be understood that variations may be made thereto without departing from the true spirit of the invention as defined in the appended claims.

What is claimed is:

1. An adjustable roller assembly for supporting and leveling an appliance comprising:
 an elongated bolt having a head portion at a first end of said bolt, a shank portion, a threaded portion, and an unthreaded terminal end portion extending longitudinally over a part of said bolt and including a second end at the end opposite said first end, wherein said shank portion lies between said head portion and said threaded portion, said threaded portion lies between said shank portion and said unthreaded terminal end portion, and at least one part of said shank portion having at least one projection thereon;
 a rail securable to the appliance and having a keyhole opening, said keyhole opening is sized and shaped such that said unthreaded portion, said threaded portion and any part of said shank portion not having a projection thereon can freely pass through said keyhole opening, but said at least one part of said shank portion having at least one projection thereon will only pass through said keyhole opening if said at least one projection is aligned to pass through said keyhole;
 a horizontal stationary base frame secured to the rail;
 a bracket having a bottom end pivotally secured to the base frame and a top end having a threaded nut spaced from the keyhole opening in the rail, the maximum distance that said nut can be from the keyhold opening in the rail when said bracket is fully pivoted away from said rail is less than the distance between said at least one projection and said second end of said bolt;

a roller rotatably secured to the bottom end of the bracket and movable up and down relative to the stationary base frame in response to pivotal movement of the bracket; and said elongated bolt is horizontally disposed with said shank portion within said keyhole opening in the rail with the head portion located on one side of the rail and a threaded portion on the opposite side of the rail and threadably engaging said nut, wherein said at least one part of said shank having at least one projection is on the same side of the rail as the threaded portion and when said at least one projection is not aligned to pass through said keyhole, said at least one projection will prevent withdrawal of the shank portion through the keyhole opening in the rail.

2. The adjustable roller assembly of claim 1, wherein the shank portion of the bolt has two stop projections, one offset from the other around the shank.

3. The adhjustable roller assembly of claim 1 wherein the stop projections is swaged into the shank portion.

4. The adjustable roller assembly of claim 1 wherein the bracket is a U-shaped channel member having a base and two spaced legs, said legs having retaining means to maintain the nut in a vertical position regardless of pivotal movement of the bracket.

5. The adjustable roller assembly of claim 1 wherein the roller is rotatably secured to the bracket in front of the pivotal securement of the bracket in the direction of the rail.

* * * * *